(12) United States Patent
Tu et al.

(10) Patent No.: US 7,702,820 B2
(45) Date of Patent: Apr. 20, 2010

(54) HARDWARE ACCELERATOR AND DATA TRANSMISSION SYSTEM AND METHOD USING THE SAME

(75) Inventors: Chang-Li Tu, Taipei (TW); Yu-Ting Hsu, Taipei (TW)

(73) Assignee: VIA Technologies, Inc., Taipei (TW)

( * ) Notice: Subject to any disclaimer, the term of this patent is extended or adjusted under 35 U.S.C. 154(b) by 243 days.

(21) Appl. No.: 11/882,956

(22) Filed: Aug. 8, 2007

(65) Prior Publication Data
US 2008/0126611 A1 May 29, 2008

Related U.S. Application Data

(60) Provisional application No. 60/861,259, filed on Nov. 28, 2006, provisional application No. 60/861,739, filed on Nov. 30, 2006.

(51) Int. Cl.
*G06F 3/00* (2006.01)
*G06F 13/28* (2006.01)

(52) U.S. Cl. .............................. 710/5; 710/18; 710/19; 710/22; 710/36

(58) Field of Classification Search ........................ None
See application file for complete search history.

(56) References Cited

U.S. PATENT DOCUMENTS 6,098,114 A * 8/2000 McDonald et al. ............. 710/5

* cited by examiner

*Primary Examiner*—Alan Chen
(74) *Attorney, Agent, or Firm*—Bacon & Thomas, PLLC (57) ABSTRACT

A data transmission system for enabling data to be transmitted from one of a host and a storage device to the other includes a bus controller, a command register, a data register, a storage device controller and a hardware accelerator. The bus controller receives a command packet from the host through a bus. The command register and the data register respectively store the command packet and the data received by the bus controller. The storage device controller controls an accessing action of the storage device. The hardware accelerator generates a control command according to the command packet and drives one of the storage device controller and the bus controller to move the data in the data register to the other according to the control command. The hardware accelerator generates a transmission state packet according to a transmission state of the data and outputs the transmission state packet to the host.

43 Claims, 5 Drawing Sheets

HARDWARE ACCELERATOR AND DATA TRANSMISSION SYSTEM AND METHOD USING THE SAME

This application claims the benefit of two U.S. provisional application Ser. No. 60/861,259, filed Nov. 28, 2006 and Ser. No. 60/861,739, filed Nov. 30, 2006, the subject matter of which is incorporated herein by reference.

BACKGROUND OF THE INVENTION

1. Field of the Invention

The invention relates in general to a data transmission system, and more particularly to a data transmission system, which has a hardware accelerator and can reduce the system resource occupation in the data transmission system.

2. Description of the Related Art

Because the universal serial bus (USB) has the advantages of plug-and-play, high supportability and high transmission efficiency, the USB has been widely used in various electronic products, such as a portable hard disk. The portable hard disk is equipped with, for example, a data processing system. When a computer host provides a command packet through the USB to access the data of the portable hard disk, the data processing system analyzes the command packet and sets a USB device controller and a hard disk controller at the end of the portable hard disk so that the computer host can access the data of the portable hard disk.

In the prior art, a memory for storing a firmware program is disposed in the data transmission system, and the processor executes the firmware program so as to access the data in response to the command packet provided by the computer host. Thus, the computation loading of the processor is increased, and the data accessing speed tends to be reduced as the computation loading of the processor becomes higher.

SUMMARY OF THE INVENTION

The invention is directed to a hardware accelerator, a data transmission system and a data transmission method, which can effectively improve the drawbacks in the conventional data transmission system having a processor for executing program codes to access the data, wherein the processor has the higher computation loading and tends to be influenced by the computation loading. Thus, the invention substantially has the advantages that the higher data accessing speed is obtained, that the processor has the lower computation loading, and that the data accessing speed cannot be easily influenced by the computation loading of the processor.

According to a first aspect of the present invention, a hardware accelerator is provided. The hardware accelerator is disposed in a data transmission system and controls data to be transmitted from one of a bus controller and a storage device controller to the other of the storage device controller and the bus controller. The hardware accelerator includes a decoding unit, a descriptor updating unit, an access control unit, a status packet updating unit and a finite state machine. The decoding unit decodes a command packet into a control command and judges whether the control command is correct. The descriptor updating unit updates a descriptor in the bus controller in response to the control command, and thus determines a transfer direction and a transfer length of the bus controller and the storage device controller. The access control unit controls the storage device controller to perform a handshake with the bus controller, controls the data to be transmitted from one of the storage device controller and the bus controller to the other of the storage device controller and the bus controller, and judges whether the data is completely transmitted. The status packet updating unit generates a status packet and outputs the status packet to the bus controller. The finite state machine drives the descriptor updating unit to update the descriptor, drives the access control unit to transfer the data and controls the status packet updating unit to generate the status packet and output the status packet to the bus controller when the control command is correct, when the descriptor is completely updated and when the data is completely transmitted, respectively.

According to a second aspect of the present invention, a data transmission method is provided. The data transmission method controls data to be transmitted from one of a storage device controller and a bus controller to the other of the storage device controller and the bus controller and includes the steps of: decoding a command packet, which is received by the bus controller, into a control command; judging whether the control command is correct; updating a descriptor of the bus controller in response to the control command when the control command is correct so as to determine a transfer direction and a transfer length of the data; controlling one of the bus controller and the storage device controller to transmit the data to the other of the storage device controller and the bus controller; judging whether the data has been completely transmitted; and generating and outputting a status packet when the data is completely transmitted.

According to a third aspect of the present invention, a data transmission system is provided. The data transmission system connects a host to a storage device and enables data to be transmitted from one of the host and the storage device to the other of the host and the storage device. The data transmission system includes a bus controller, a command register, a data register, a storage device controller and a hardware accelerator. The bus controller is connected to the host through a bus and receives a command packet. The command register stores the command packet received by the bus controller. The data register stores the data. The storage device controller controls an accessing action of the storage device. The hardware accelerator generates a control command according to the command packet in the command register in response to an initial event, and moves the data in the data register from one of the storage device controller and the bus controller to the other of the storage device controller and the bus controller according to the control command. The hardware accelerator generates a status packet according to a transmission state of the data and transmits the status packet to the host through the bus controller.

The invention will become apparent from the following detailed description of the preferred but non-limiting embodiment. The following description is made with reference to the accompanying drawings.

DETAILED DESCRIPTION OF THE INVENTION

The data transmission system of this embodiment has a hardware accelerator to replace a processing unit and execute a normal data accessing action. Thus, the computation loading of the processor may be reduced, and the data accessing efficiency and speed of the data transmission system may be enhanced.

Figure 1:
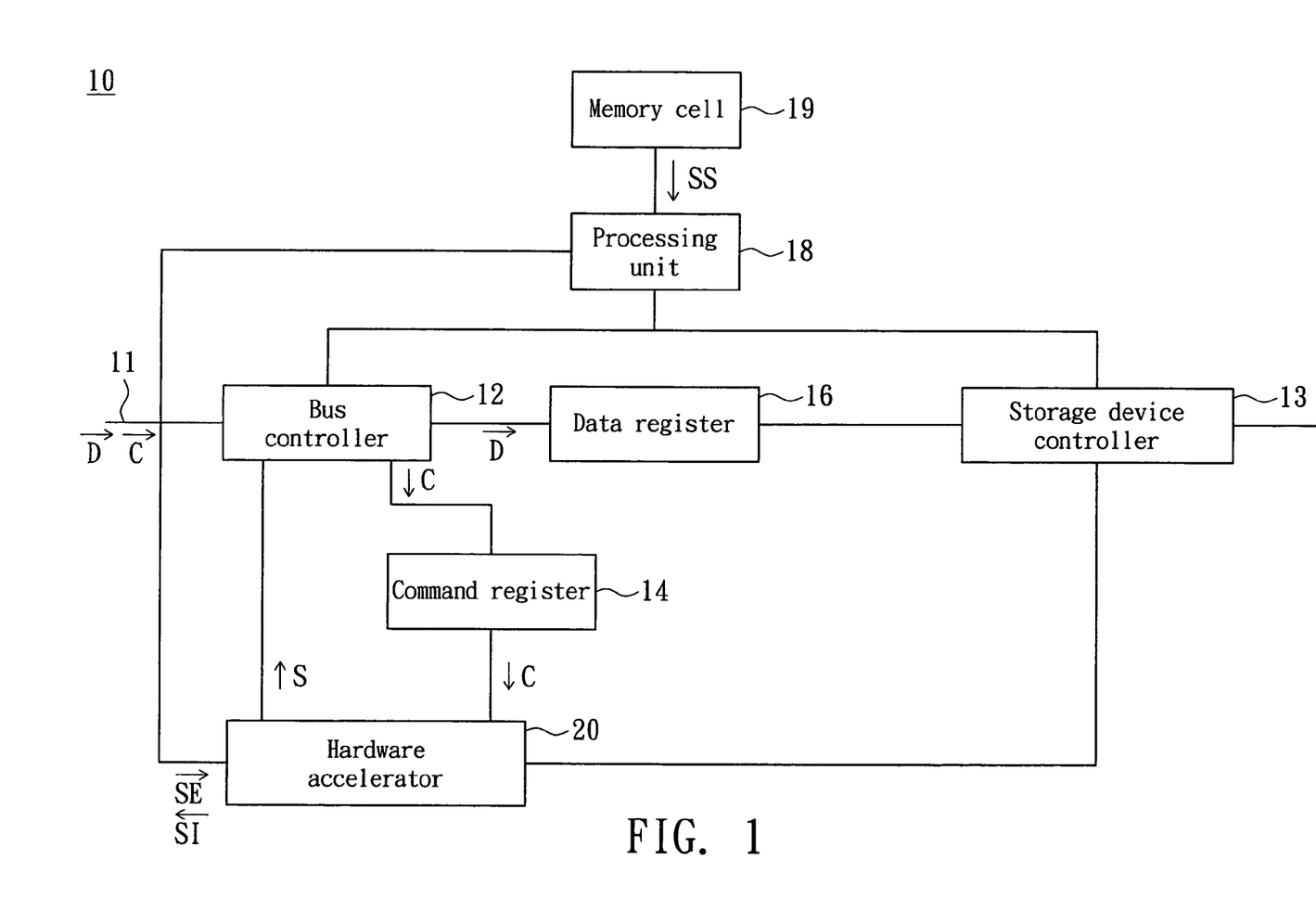
FIG. 1 is a block diagram showing a data transmission system according to a preferred embodiment of the invention.

FIG. 1 is a block diagram showing a data transmission system 10 according to a preferred embodiment of the invention. As shown in FIG. 1, the data transmission system 10 connects a host (not shown) to a storage device (not shown) and drives one of the host and the storage device to transmit data to the other of the host and the storage device. The host and the storage device in this embodiment may be, for example, a computer host and a serial advanced technology attachment (Serial ATA, SATA) interface hard disk, respectively. The computer host is connected to the data transmission system 10 through a universal serial bus (USB) 11, for example. In the following, illustrations will be made by taking the computer host for transmitting a data packet D to the storage device as an example.

The data transmission system 10 includes a bus controller 12, a storage device controller 13, a command register 14, a data register 16 and a hardware accelerator 20. The bus controller 12, such as a USB device controller, receives a command packet C and the data packet D provided by the computer host through the USB 11, and stores the command packet C and the data packet D to the command register 14 and the data register 16, respectively. The storage device controller 13, such as a SATA controller, controls the accessing action of a SATA hard disk.

The hardware accelerator 20 generates a control command according to the command packet C in the command register 14 in response to an initial event SE, and controls the bus controller and the SATA controller to move the data packet D in the data register 16 to the SATA hard disk according to the control command. When the computer host and the SATA hard disk finish transmitting the data packet D, the hardware accelerator 20 generates a status packet S according to a transmission state of the data packet D, and transmits the status packet S to the computer host through the USB device controller and the USB 11. Thus, the operation of transmitting the data packet D from the computer host to the SATA hard disk is finished.

The data transmission system 10 further has a processing unit 18 and a memory cell 19, for example. The memory cell 19 stores an initial program code SS, and the processing unit 18 reads the initial program code SS to trigger the initial event SE.

Figure 2:
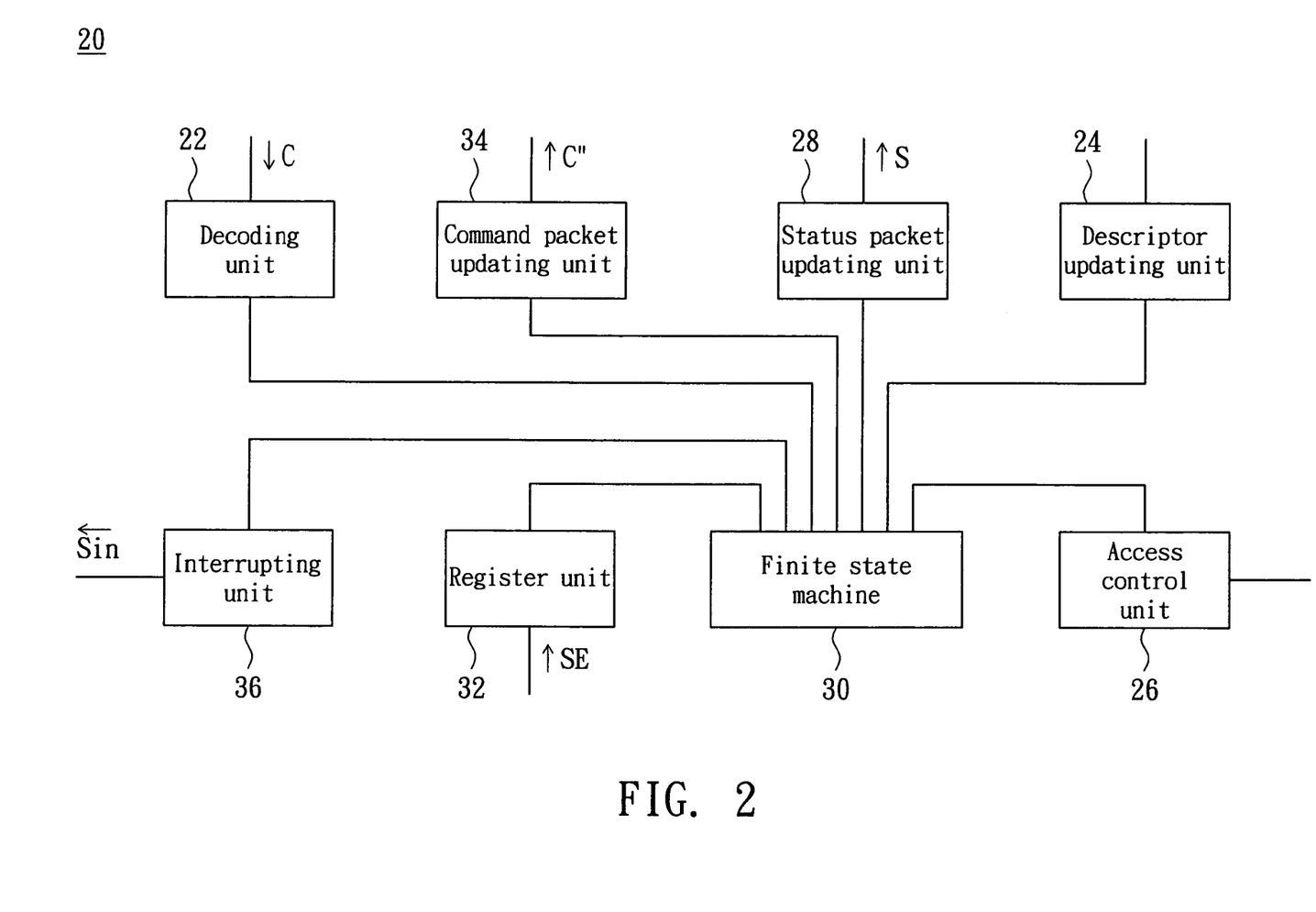
FIG. 2 is a block diagram showing a hardware accelerator according to this embodiment of the invention.

FIG. 2 is a block diagram showing the hardware accelerator 20 according to this embodiment of the invention. Referring to FIG. 2, the hardware accelerator 20 includes a decoding unit 22, a descriptor updating unit 24, an access control unit 26, a status packet updating unit 28 and a finite state machine 30. The decoding unit 22 receives the command packet C in the command register 14 and decodes the command packet C into a control command (not shown). The decoding unit 22 further judges whether the control command is correct and notifies the finite state machine 30 the judged result.

The descriptor updating unit 24 updates a transmission descriptor in the USB device controller in response to the control command so as to determine a transfer direction and a transfer length of the data packet D. The access control unit 26 sets the SATA controller in response to the control command so as to control the SATA controller to move the data packet D in the data register 16 to the SATA hard disk. The access control unit 26 further judges whether the data packet D has been completely transmitted and notifies the finite state machine 30 the judged result.

The status packet updating unit 28 generates the status packet S according to the transmission state of the data packet D and outputs the status packet S to the command register 14. The status packet S is outputted to the computer host through the USB device controller and the USB 11. The finite state machine 30 drives the descriptor updating unit 24 to update the transmission descriptor when the control command is correct, drives the access control unit 26 to control the SATA controller to move the data packet D to the SATA hard disk when the transmission descriptor of the USB device controller is completely updated, and controls the status packet updating unit 28 to generate the status packet S and output the status packet S to the USB device controller when the data packet D is transmitted to the SATA hard disk.

For example, the decoding unit 22 judges whether the control command is an accessing command and whether a total data length in the command packet C is greater than zero so as to judge whether the control command is correct. The total data length indicates a data length of the data packet D. When the control command is the accessing command and the total data length is greater than zero, it represents that the control command is correct.

The access control unit 26 judges whether the USB device controller and the SATA controller have finished the data transmission and whether a to-be-transferred length is equal to zero so as to judge whether the data packet D has been completely transmitted. The to-be-transferred length is recorded in the transmission register (not shown) and is equal to a difference between the total data length and the transfer length. The transmission register is located in the USB device controller, for example. When the USB device controller and the SATA controller have finished the data transmission and the to-be-transferred length is equal to zero, it represents that the data packet D has been completely transmitted.

The hardware accelerator 20 has, for example, a register unit 32 for driving the operation of the hardware accelerator 20 in response to the initial event SE. The hardware accelerator 20 has, for example, an initial register, wherein the data stored in the initial register is changed or not in response to the triggering of the initial event SE or not. For example, when the initial event SE is triggered, the data of the initial register is converted from data 0 into data 1. In this case, the register unit 32 drives the operation of the hardware accelerator 20 through the finite state machine 30.

The hardware accelerator 20 has, for example, a command package updating unit 34 for updating the command packet C in the command register 14 to be an updated command packet C", wherein the total data length therein is equal to the transfer length. The hardware accelerator 20 has, for example, an interrupting unit 36 for generating an interrupting signal Sin and outputting the interrupting signal Sin to the processing unit 18 to stop the operation of the hardware accelerator 20.

Figure 3:
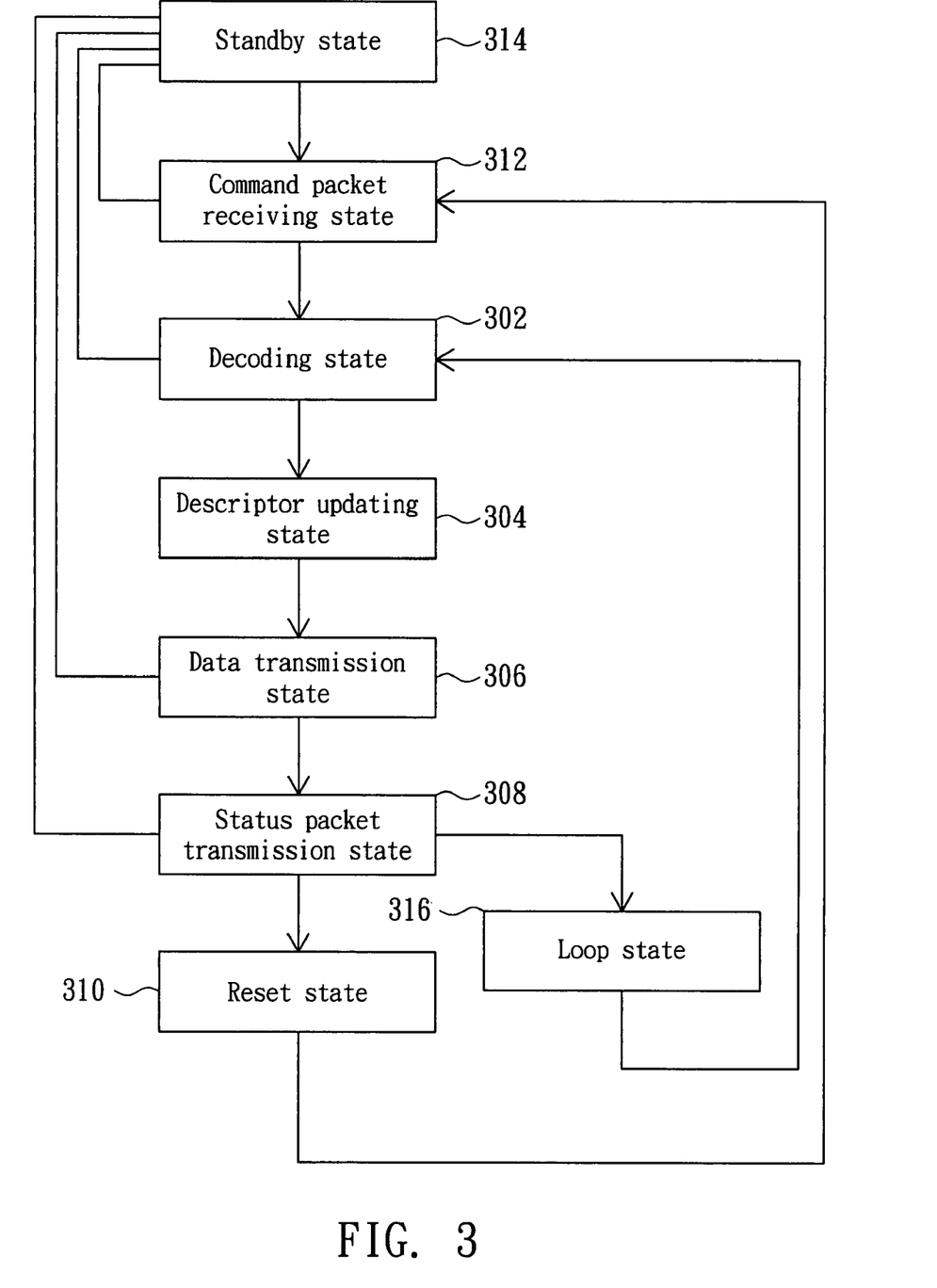
FIG. 3 shows a detailed state of a finite state machine of FIG. 2.

FIG. 3 shows a detailed state of a finite state machine of FIG. 2. Referring to FIG. 3, the finite state machine 30 includes a decoding state 302, a descriptor updating state 304, a data transmission state 306 and a status packet transmission state 308. When the finite state machine 30 is in the decoding state 302, it drives the decoding unit 22 to decode the command packet C and judges whether the obtained control command is correct. When the control command is correct, the finite state machine 30 enters the descriptor updating state 304 to drive the descriptor updating unit 24 to update the transmission descriptor.

When the transmission descriptor is completely updated, the finite state machine 30 enters the data transmission state 306 to drive the access control unit 26 to control the SATA controller to move the data packet D to the SATA hard disk and thus to transmit the data packet D to the SATA hard disk. The finite state machine 30 drives the judged result obtained when the access control unit 26 judges whether the data packet D is completely transmitted. When the data packet D is completely transmitted, the finite state machine 30 enters the status packet transmission state 308 so as to drive the status packet updating unit 28 to generate the status packet S and output the status packet S to the command register 14. The status packet updating unit 28 outputs the status packet S to the computer host through the USB device controller and the USB 11.

In the status packet transmission state 308, the finite state machine 30 further drives the status packet updating unit 28 to judge whether the status packet S is successfully outputted to the computer host. The finite state machine 30 further has, for example, a reset state 310. When the status packet S is successfully outputted to the computer host, the finite state machine 30 enters the reset state 310 so as to drive the descriptor updating unit 24 to reset the transmission descriptor and thus to stop the data transmission between the USB device controller and the SATA controller.

The finite state machine 30 further has, for example, a command packet receiving state 312 for driving the USB device controller to receive the command packet C and judging whether the command packet C has been completely received. When the USB device controller successfully receives the command packet C, the finite state machine 30 enters the decoding state 302 so as to decode the command packet C. After the finite state machine 30 has finished the operation of driving the descriptor updating unit 24 to reset the transmission descriptor in the state 310, the finite state machine 30 enters, for example, the command packet receiving state 312 so as to receive a next command packet and drive the corresponding hardware unit to operate.

The finite state machine 30 further has, for example, a standby state 314 for driving the register unit 32 to judge whether the initial event SE has been triggered, wherein the other hardware units in the hardware accelerator 20 are disabled. When the initial event SE is triggered, the finite state machine 30 enters the command packet receiving state 312 so as to drive the corresponding hardware unit to perform the corresponding operation.

When the decoding unit 22 judges that the control command is incorrect in the operation of the hardware accelerator 20, when the access control unit 26 judges that the transmission of the data packet D fails, and when the status packet updating unit 28 judges that the status packet S cannot be transmitted to the computer host and that the USB device controller cannot receive the operation error of the command packet C, the finite state machine 30 drives the interrupting unit 36 to generate the interrupting signal Sin and output the interrupting signal Sin to the processing unit 18 so that the operation error can be eliminated through the processing unit 18. The finite state machine 30 enters the standby state 314 from its original state so as to wait for the trigger of a next enabled event ES to transmit the data.

The finite state machine 30 further has, for example, a loop state 316. In the data transmission state 306, when the access control unit 26 judges that the to-be-transferred length is unequal to zero, i.e., when the data packet D is not completely transmitted, the finite state machine 30 enters the loop state 316 so as to control the command packet updating unit 34 to update the command packet C to be the update command packet C", wherein the total data length therein is equal to the to-be-transferred length. After the command packet C is completely updated, the finite state machine 30 goes back to the decoding state 302 to obtain the control command again by way of decoding so that the residual data packet D can be transmitted.

Figure 4A:
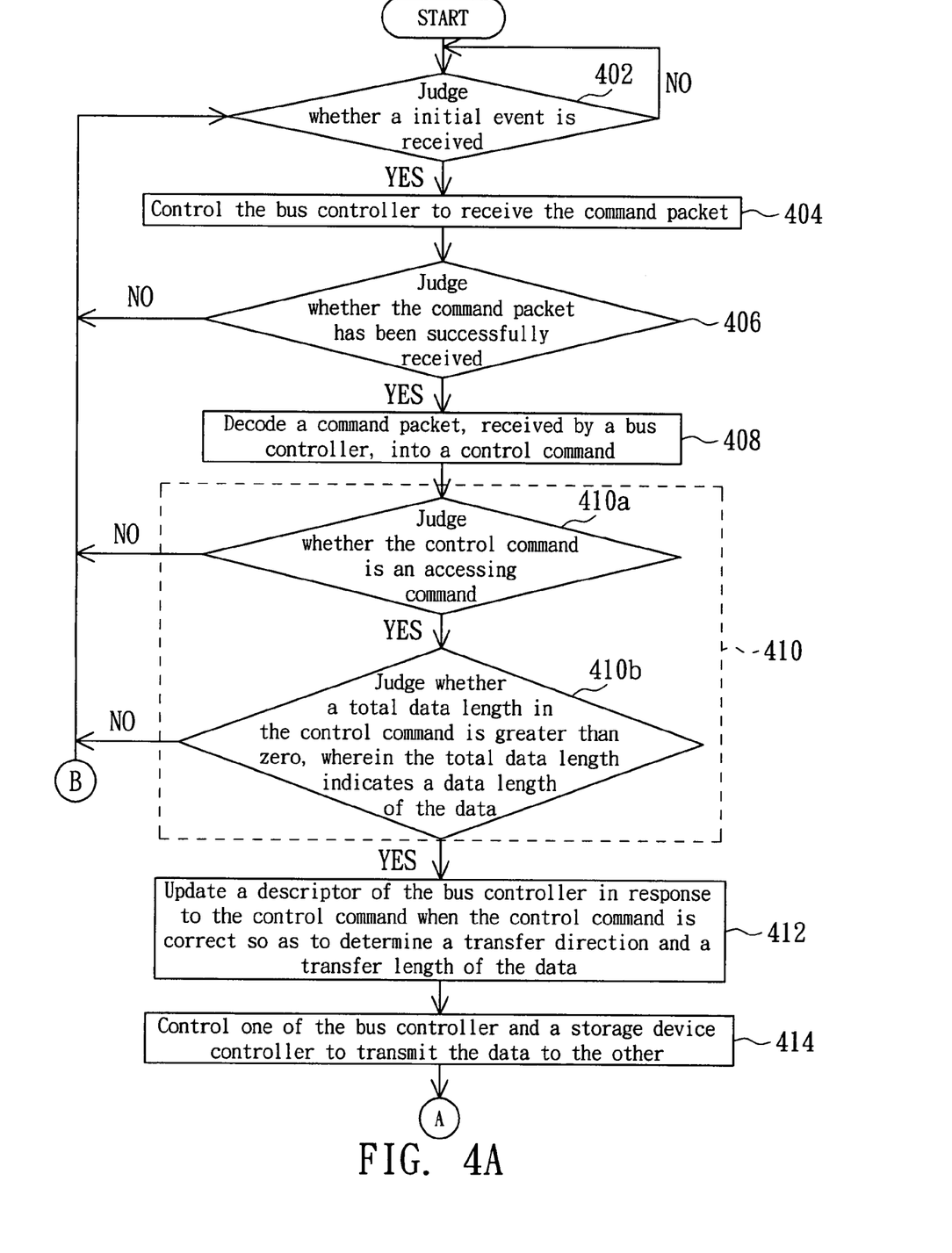
FIGS. 4A and 4B are flow charts showing a data transmission method according to the preferred embodiment of the invention.
Figure 4B:
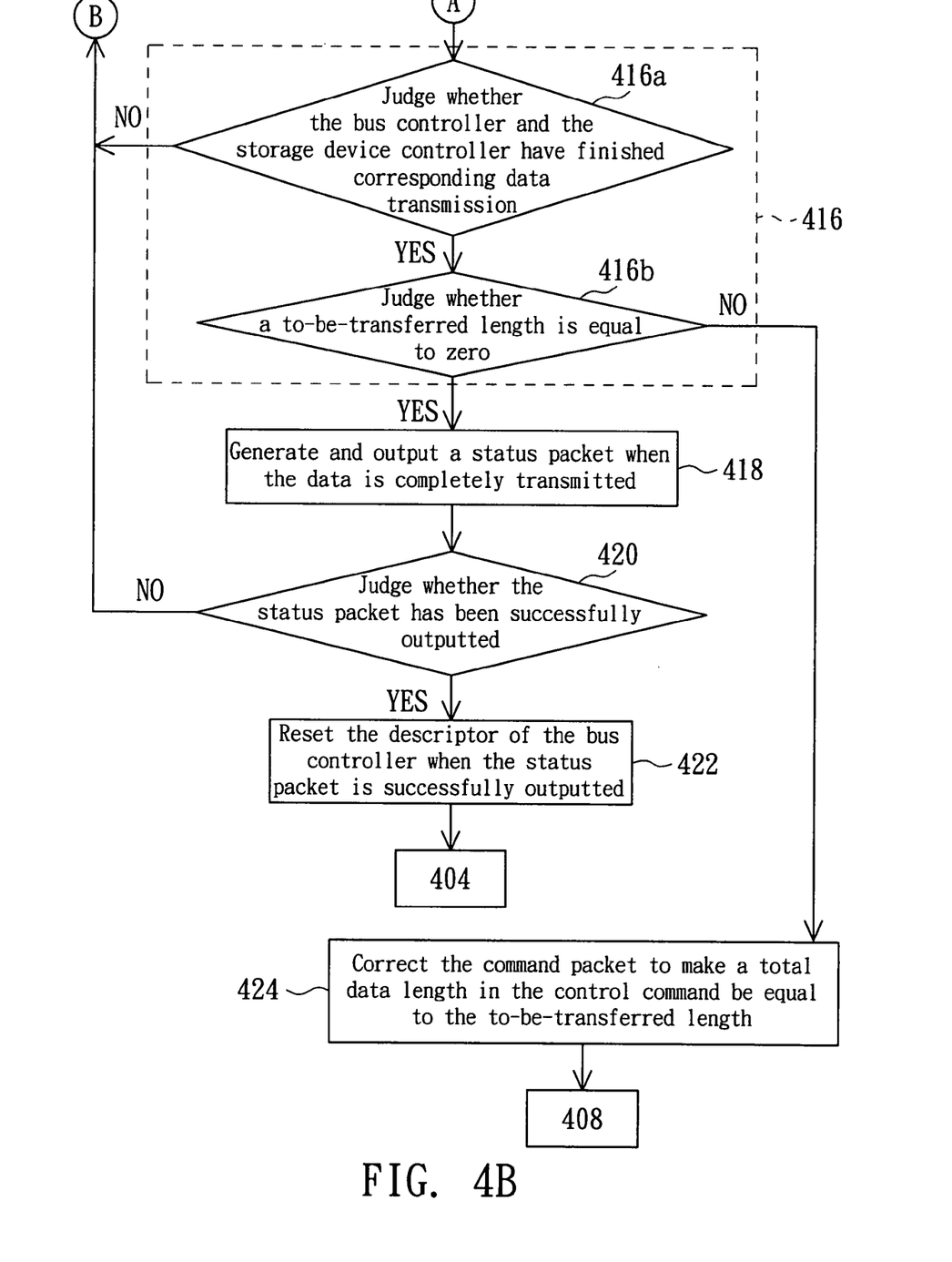

FIGS. 4A and 4B are flow charts showing a data transmission method according to the preferred embodiment of the invention. First, as shown in step 402, the finite state machine 30 is in the standby state 314, and the register unit 32 judges whether the initial event SE is received. If yes, as shown in step 404, the finite state machine 30 enters the command packet receiving state 312, and the USB device controller receives the command packet C. Next, as shown in step 406, the USB device controller further judges whether it successfully receives the command packet C.

If yes, as shown in step 408, the finite state machine 30 enters the decoding state 302, and the decoding unit 22 decodes the command packet C into the control command. Next, as shown in step 410, the decoding unit 22 judges whether the control command is correct. If yes, as shown in step 412, the finite state machine 30 enters the descriptor updating state 304, and the descriptor updating unit 24 updates the transmission descriptor of the USB device controller in response to the control command so as to determine the transfer direction and the transfer length of the data packet D.

Next, as shown in step 414, when the transmission descriptor is completely updated, the finite state machine 30 enters the data transmission state 306, and the USB device controller and the access control unit 26 control the SATA controller to move the data packet D to the SATA hard disk. Then, as shown in step 416, the access control unit 26 further judges whether the data packet D has been completely transmitted. If yes, step 418 is performed, in which the finite state machine 30 enters the status packet transmission state 308, and the status packet updating unit 28 generates the status packet S and outputs the status packet S to the command register 14 and transmits the status packet S to the computer host through the USB device controller and the USB 11 so that the data transmission method of this embodiment is finished.

The method further includes, after step 420, step 422, in which the status packet updating unit 28 further judges whether the status packet S is successfully outputted to the computer host. If yes, as shown in step 424, the finite state machine 30 enters the reset state 310 and the descriptor updating unit 24 resets the transmission descriptor so as to stop the data transmission between the USB device controller and the SATA controller. After step 422, the data transmission method of this embodiment goes back to step 404 for receiving a next command packet and performing the corresponding operation.

In this embodiment, step 410 for judging whether the control command is correct includes, for example, steps 410*a* and 410*b*. In step 410*a*, the decoding unit 22 judges whether the control command is the accessing command. If yes, step 410*b* is performed and the decoding unit 22 judges whether the total data length is greater than zero. If yes, it represents that the control command is correct, and then step 412 is performed.

In this embodiment, step 416 for judging whether the data packet D has been completely transmitted includes, for example, steps 416*a* and 416*b*. In step 416*a*, the access control unit 26 judges whether the USB device controller and the SATA controller have finished the corresponding data transmission. If yes, step 416*b* is performed, in which the access control unit 26 judges whether the to-be-transferred length is equal to zero. If yes, it represents that the data packet D has been completely transmitted, and then step 418 is performed.

In the step 406, 410a, 410b, 416a and 420 of this embodiment, the data transmission method goes back to step 402 if it is judged that the command packet C cannot be received, that the control command is not the accessing command, that the total data length is not greater than zero, that the USB device controller and the SATA controller cannot finish the data transmission, and that the status packet S cannot be transmitted to the computer host. At this time, the finite state machine 30 drives the interrupting unit 36 to generate the interrupting signal Sin and output the interrupting signal Sin to the processing unit 18 to interrupt the operation of the hardware accelerator 20.

In step 416b, if it is judged that the to-be-transferred length is unequal to zero, step 424 is performed, in which the finite state machine 30 enters the loop state 316, and the command packet updating unit 34 corrects the command packet C in the command register 14 to be the updated command packet C" so that the total data length thereof is equal to the to-be-transferred length. Then, the method goes back to step 408.

The computer host and the SATA hard disk transmit the data packet D through, for example, the USB bulk transfer in this embodiment, and the command packet C of this embodiment is, for example, a command block word (CBW) in the USB bulk transfer. The decoding unit 22 decrypts the CBW into the control command with the small computer standard interface (SCSI) format, and then completes the command phase in the bulk transfer according to the control command. The operation of moving the data packet in the data register 16 to the SATA hard disk according to the control command in the descriptor updating unit 24 and the access control unit 26 is to complete the data phase in the bulk transfer.

The status packet S may be, for example, a command status word (CSW) in the USB bulk transfer. The CSW replies the data transmission state between the data transmission system 10 and the SATA hard disk end to the computer host end when the data packet D is completely transmitted so that the status phase in the USB bulk transfer is completed. Thus, the hardware accelerator 20 of this embodiment can effectively enable the data packet D to be transmitted between the computer system and the SATA hard disk through the hardware accelerator 20.

In this embodiment, the example, in which the data packet D is transmitted from the computer host to the SATA hard disk, is illustrated. However, the data packet can be transmitted from the SATA hard disk to the computer host, and the operations in this case can be derived according to the description of this embodiment. In the illustrated embodiment, the data transmission between the computer host and the SATA hard disk is performed through the USB 11 and the USB bulk transfer protocol using the bus controller 12 as the USB device controller. However, the bus controller 12 of this embodiment is not restricted to the USB device controller and may be other types of bus controllers. The storage device of this embodiment is also not restricted to the SATA hard disk, and may be other storage devices with other serial transmission interfaces.

The data transmission system of this embodiment has the hardware accelerator to replace the processing unit and perform the data accessing action in the normal operation. Thus, the data transmission system of this embodiment can effectively improve the drawbacks that the higher computation loading of the processor is caused and that the data accessing speed tends to be influenced by the computation loading of the processor in the conventional data transmission system, which accesses the data through the processor executing the program code. Thus, the invention substantially has the advantages that the higher data accessing speed is obtained, that the lower computation loading of the processor is obtained, and that the data accessing speed cannot be easily influenced by the computation loading of the processor.

In addition, the data transmission system or method of this embodiment performs the control of moving the data of the data register directly through the hardware unit, such as the access controller. Thus, the embodiment may further effectively omit the setting time of setting the DMA engine in the conventional data transmission system. Consequently, the data transmission system of this embodiment may further has the advantage of shortening the accessing time for the host to access the storage device, and the advantage of enhancing the data accessing efficiency between the host and the access device.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hardware accelerator, disposed in a data transmission system, for controlling data to be transmitted from one of a bus controller and a storage device controller to the other of the storage device controller and the bus controller, the hardware accelerator comprising:
    a decoding unit for decoding a command packet into a control command and judging whether the control command is correct;
    a descriptor updating unit for updating a descriptor in the bus controller in response to the control command, and thus determining a transfer direction and a transfer length of the bus controller and the storage device controller;
    an access control unit for controlling the storage device controller to perform a handshake with the bus controller, controlling the data to be transmitted from one of the storage device controller and the bus controller to the other of the storage device controller and the bus controller, and judging whether the data is completely transmitted;
    a status packet updating unit for generating a status packet and outputting the status packet to the bus controller; and
    a finite state machine for driving the descriptor updating unit to update the descriptor, driving the access control unit to transfer the data and controlling the status packet updating unit to generate the status packet and output the status packet to the bus controller when the control command is correct, when the descriptor is completely updated and when the data is completely transmitted, respectively.

2. The hardware accelerator according to claim 1, wherein:
    the decoding unit judges whether the control command is an accessing command and whether one total data length in the control command is greater than zero so as to judge whether the control command is correct;
    the total data length indicates a data length of the data; and
    when the control command is the accessing command and the total data length is greater than zero, it represents that the control command is correct.

3. The hardware accelerator according to claim 1, wherein:
    the access control unit judges whether the bus controller and the storage device controller have finished corresponding data transmission and whether a to-be-transferred length is equal to zero so as to judge whether the data has been completely transmitted;

the to-be-transferred length is a difference between a data length of the data and the transfer length; and when the bus controller and the storage device controller have finished the corresponding data transmission and the to-be-transferred length is equal to zero, it represents that the data is completely transmitted.

4. The hardware accelerator according to claim 1, further comprising a command packet updating unit for updating a total data length in the command packet to be equal to a to-be-transferred length, wherein the total data length indicates a data length of the data, and the to-be-transferred length is equal to a difference between the total data length and the transfer length.

5. The hardware accelerator according to claim 1, further comprising:

a register unit for enabling the hardware accelerator in response to an initial event triggered in the data transmission system so as to control the data to be transmitted from one of the bus controller and the storage device controller to the other of the storage device controller and the bus controller.

6. The hardware accelerator according to claim 1, wherein the finite state machine comprises:

a decoding state for driving the decoding unit to decode the command packet and judging whether the control command is correct;

a descriptor updating state for driving the descriptor updating unit to update the descriptor when the control command is correct;

a data transmission state for driving the storage device controller and the bus controller to transmit the data when the descriptor is completely updated and judging whether the data is completely transmitted; and a status packet transmission state for driving the status packet updating unit to generate the status packet and outputting the status packet when the data is completely transmitted.

7. The hardware accelerator according to claim 6, wherein when the control command is not correct, the finite state machine drives an interrupting unit to generate an interrupting signal to interrupt an operation of the hardware accelerator.

8. The hardware accelerator according to claim 6, wherein:

the access control unit judges whether the bus controller and the storage device controller have finished corresponding data transmission and whether a to-be-transferred length is equal to zero so as to judge whether the data is completely transmitted;

the to-be-transferred length is a difference between a total data length in the command packet and the transfer length, and the total data length indicates a data length of the data; and when the bus controller and the storage device controller have finished the corresponding data transmission and the to-be-transferred length is equal to zero, it represents that the data is completely transmitted, and the finite state machine enters the status packet transmission state.

9. The hardware accelerator according to claim 8, wherein:

the finite state machine further comprises a loop state for controlling a command packet updating unit to update the total data length to be equal to the to-be-transferred length when the bus controller and the storage device controller have finished the corresponding data transmission and the to-be-transferred length is unequal to zero; and when the total data length is completely updated, the finite state machine enters the decoding state to again drive the decoding unit to decode the command packet.

10. The hardware accelerator according to claim 9, wherein when the bus controller and the storage device controller cannot finish the corresponding data transmission, the finite state machine drives an interrupting unit to generate an interrupting signal for interrupting an operation of the hardware accelerator.

11. The hardware accelerator according to claim 6, wherein:

the finite state machine further comprises a command packet receiving state for controlling the bus controller to receive the command packet and judging whether the bus controller has successfully received the command packet; and when the bus controller successfully receives the command packet, the finite state machine enters the decoding state.

12. The hardware accelerator according to claim 11, wherein:

the finite state machine further comprises a standby state for driving a register unit to detect an initial event triggered in the data transmission system; and when the register unit detects the initial event, the finite state machine enters the command packet receiving state.

13. The hardware accelerator according to claim 6, wherein:

in the data transmission state, the finite state machine further drives the status packet updating unit to judge whether the status packet has been successfully outputted to the bus controller; and when the status packet cannot be successfully outputted to the bus controller, the finite state machine drives an interrupting unit to generate an interrupting signal for interrupting an operation of the hardware accelerator.

14. The hardware accelerator according to claim 13, wherein the finite state machine comprises:

a reset state for driving the descriptor updating unit to reset the descriptor when the status packet is successfully outputted to the bus controller.

15. The hardware accelerator according to claim 14, wherein:

the finite state machine further comprises a command packet receiving state for controlling the bus controller to receive the command packet and judging whether the bus controller has successfully received the command packet; and when the descriptor has been completely updated, the finite state machine enters the command packet receiving state.

16. A data transmission method for controlling data to be transmitted from one of a storage device controller and a bus controller to the other of the storage device controller and the bus controller, the data transmission method comprising the steps of:

(a) decoding a command packet, which is received by the bus controller, into a control command;

(b) judging whether the control command is correct, wherein step (b) comprises:

(b1) judging whether the control command is an accessing command; and (b2) judging whether a total data length in the control command is greater than zero, wherein the total data length indicates a data length of the data, wherein when the control command is the accessing command and the total data length is greater than zero, it represents that the control command is correct and then step (c) is performed;

(c) updating a descriptor of the bus controller in response to the control command when the control command is correct so as to determine a transfer direction and a transfer length of the data;

(d) controlling one of the bus controller and the storage device controller to transmit the data to the other of the storage device controller and the bus controller;

(e) judging whether the data has been completely transmitted; and (f) generating and outputting a status packet when the data is completely transmitted.

17. The method according to claim 16, wherein an interrupting event is triggered when the control command is the accessing command and the total data length is equal to zero.

18. The method according to claim 16, wherein an interrupting event is triggered when the control command is not the accessing command.

19. The method according to claim 16, wherein step (e) comprises:

(e1) judging whether the bus controller and the storage device controller have finished corresponding data transmission; and (e2) judging whether a to-be-transferred length is equal to zero, wherein the to-be-transferred length is a difference between a total data length and the transfer length, and the total data length indicates a data length of the data, wherein when the bus controller and the storage device controller have finished the corresponding data transmission and the to-be-transferred length is equal to zero, it represents that the data is completely transmitted and then step (f) is performed.

20. The method according to claim 19, further comprising, when the bus controller and the storage device controller have finished the corresponding data transmission and the to-be-transferred length is not equal to zero, the step of:

(g) correcting the command packet to make a total data length in the control command be equal to the to-be-transferred length, and then performing step (a) again to decode the control command into the control command and transmit the data, wherein the total data length indicates the data length of the data.

21. The method according to claim 19, wherein an interrupting event is triggered when the bus controller and the storage device controller cannot finish the corresponding data transmission.

22. The method according to claim 16, further comprising the steps of:

(h) controlling the bus controller to receive the command packet; and (i) judging whether the command packet has been successfully received, wherein step (a) is performed when the bus controller has successfully received the command packet.

23. The method according to claim 22, wherein an interrupting event is triggered when the bus controller cannot receive the command packet.

24. The method according to claim 22, further comprising:

(j) judging whether an initial event is received, wherein step (h) is performed when the initial event is received.

25. The method according to claim 16, further comprising the steps of:

(k) judging whether the status packet has been successfully outputted; and (l) resetting the descriptor of the bus controller when the status packet is successfully outputted.

26. The method according to claim 25, further comprising, after step (l), the step of:

(h) controlling the bus controller to receive the command packet so as to receive a next command packet to perform next data transmission.

27. The method according to claim 25, wherein an interrupting event is triggered when the status packet cannot be successfully outputted.

28. A data transmission system for connecting a host to a storage device and enabling data to be transmitted from one of the host and the storage device to the other of the host and the storage device, the data transmission system comprising:

a bus controller, which is connected to the host through a bus, for receiving a command packet;

a command register for storing the command packet received by the bus controller;

a data register for storing the data;

a storage device controller for controlling an accessing action of the storage device; and a hardware accelerator for generating a control command according to the command packet in the command register in response to an initial event, and moving the data in the data register from one of the storage device controller and the bus controller to the other of the storage device controller and the bus controller according to the control command, wherein the hardware accelerator comprises:

a decoding unit for decoding the command packet into the control command and judging whether the control command is correct;

a descriptor updating unit for updating a descriptor in the bus controller in response to the control command, and thus determining a transfer direction and a transfer length of the bus controller and the storage device controller;

an access control unit for controlling the storage device controller to perform a handshake with the bus controller, controlling the data to be transmitted from one of the storage device controller and the bus controller to the other of the storage device controller and the bus controller, and judging whether the data is completely transmitted;

a status packet updating unit for generating the status packet and outputting the status packet to the bus controller; and a finite state machine for driving the descriptor updating unit to update the descriptor, driving the access control unit to transfer the data and controlling the status packet updating unit to generate the status packet and output the status packet to the bus controller when the control command is correct, when the descriptor is completely updated and when the data is completely transmitted, respectively, wherein the hardware accelerator generates a status packet according to a transmission state of the data and transmits the status packet to the host through the bus controller.

29. The system according to claim 28, wherein:

the decoding unit judges whether the control command is an accessing command and whether one total data length in the control command is greater than zero so as to judge whether the control command is correct;

the total data length indicates a data length of the data; and when the control command is the accessing command and the total data length is greater than zero, it represents that the control command is correct.

30. The system according to claim 28, wherein:
the access control unit judges whether the bus controller and the storage device controller have finished corresponding data transmission and whether a to-be-transferred length is equal to zero so as to judge whether the data has been completely transmitted;
the to-be-transferred length is a difference between a data length of the data and the transfer length; and
when the bus controller and the storage device controller have finished the corresponding data transmission and the to-be-transferred length is equal to zero, it represents that the data is completely transmitted.

31. The system according to claim 28, wherein the hardware accelerator further comprises a command packet updating unit for updating a total data length in the command packet to be equal to a to-be-transferred length, wherein the total data length indicates a data length of the data, and the to-be-transferred length is equal to a difference between the total data length and the transfer length.

32. The system according to claim 28, wherein the hardware accelerator further comprises:
a register unit for enabling the hardware accelerator in response to an initial event triggered in the data transmission system so as to control the data to be transmitted from one of the bus controller and the storage device controller to the other of the storage device controller and the bus controller.

33. The system according to claim 28, wherein the finite state machine comprises:
a decoding state for driving the decoding unit to decode the command packet and judging whether the control command is correct;
a descriptor updating state for driving the descriptor updating unit to update the descriptor when the control command is correct;
a data transmission state for driving the storage device controller and the bus controller to transmit the data when the descriptor is completely updated and judging whether the data is completely transmitted; and
a status packet transmission state for driving the status packet updating unit to generate the status packet and outputting the status packet when the data is completely transmitted.

34. The system according to claim 33, wherein when the control command is not correct, the finite state machine drives an interrupting unit to generate an interrupting signal to interrupt an operation of the hardware accelerator.

35. The system according to claim 33, wherein:
the access control unit judges whether the bus controller and the storage device controller have finished corresponding data transmission and whether a to-be-transferred length is equal to zero so as to judge whether the data is completely transmitted;
the to-be-transferred length is a difference between a total data length in the command packet and the transfer length, and the total data length indicates a data length of the data; and
when the bus controller and the storage device controller have finished the corresponding data transmission and the to-be-transferred length is equal to zero, it represents that the data is completely transmitted, and the finite state machine enters the status packet transmission state.

36. The system according to claim 35, wherein:
the finite state machine further comprises a loop state for controlling command packet updating unit to update the total data length to be equal to the to-be-transferred length when the bus controller and the storage device controller have finished the corresponding data transmission and the to-be-transferred length is unequal to zero; and
when the total data length is completely updated, the finite state machine enters the decoding state to again drive the decoding unit to decode the command packet so that the data can be transmitted.

37. The system according to claim 36, wherein when the bus controller and the storage device controller cannot finish the corresponding data transmission, the finite state machine drives an interrupting unit to generate an interrupting signal for interrupting an operation of the hardware accelerator.

38. The system according to claim 33, wherein:
the finite state machine further comprises a command packet receiving state for controlling the bus controller to receive the command packet and judging whether the bus controller has successfully received the command packet; and
when the bus controller successfully receives the command packet, the finite state machine enters the decoding state.

39. The system according to claim 38, wherein:
the finite state machine further comprises a standby state for driving a register unit to detect an initial event triggered in the data transmission system; and
when the register unit detects the initial event, the finite state machine enters the command packet receiving state.

40. The system according to claim 33, wherein:
in the data transmission state, the finite state machine further drives the status packet updating unit to judge whether the status packet has been successfully outputted to the bus controller; and
when the status packet cannot be successfully outputted to the bus controller, the finite state machine drives an interrupting unit to generate an interrupting signal for interrupting an operation of the hardware accelerator.

41. The system according to claim 40, wherein the finite state machine comprises:
a reset state for driving the descriptor updating unit to reset the descriptor when the status packet is successfully outputted to the bus controller.

42. The system according to claim 41, wherein:
the finite state machine further comprises a command packet receiving state for controlling the bus controller to receive the command packet and judging whether the bus controller has successfully received the command packet; and
when the descriptor has been completely updated, the finite state machine enters the command packet receiving state.

43. The system according to claim 28, further comprising:
a computer-readable medium for storing at least one piece of initial data; and
a processor for reading and executing the initial data in the computer-readable medium so as to trigger the initial event.

* * * * *